March 8, 1955     R. W. HILTON     2,703,711
PRESSURE FLUID CONTROLLED STOCK FEEDER FOR PUNCH PRESSES
Filed Sept. 1, 1949     4 Sheets-Sheet 1

INVENTOR
RALPH W. HILTON
BY
*Mason & Graham*
ATTORNEYS

March 8, 1955  R. W. HILTON  2,703,711
PRESSURE FLUID CONTROLLED STOCK FEEDER FOR PUNCH PRESSES
Filed Sept. 1, 1949  4 Sheets-Sheet 2
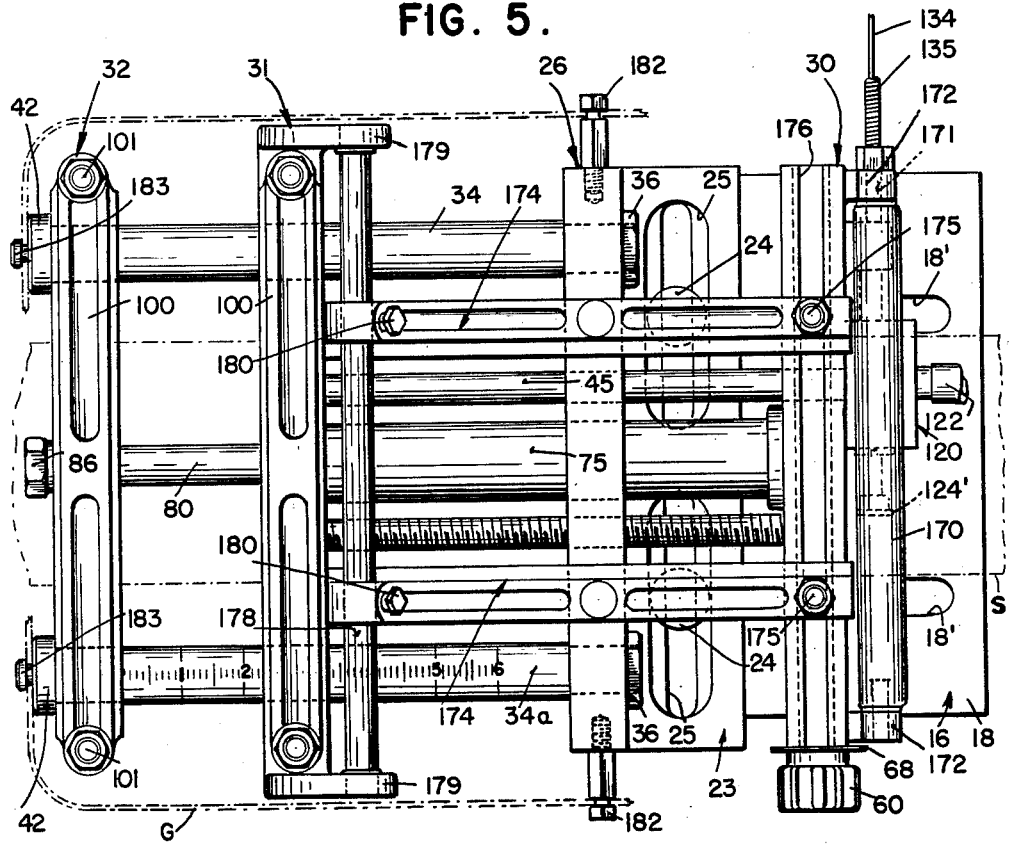
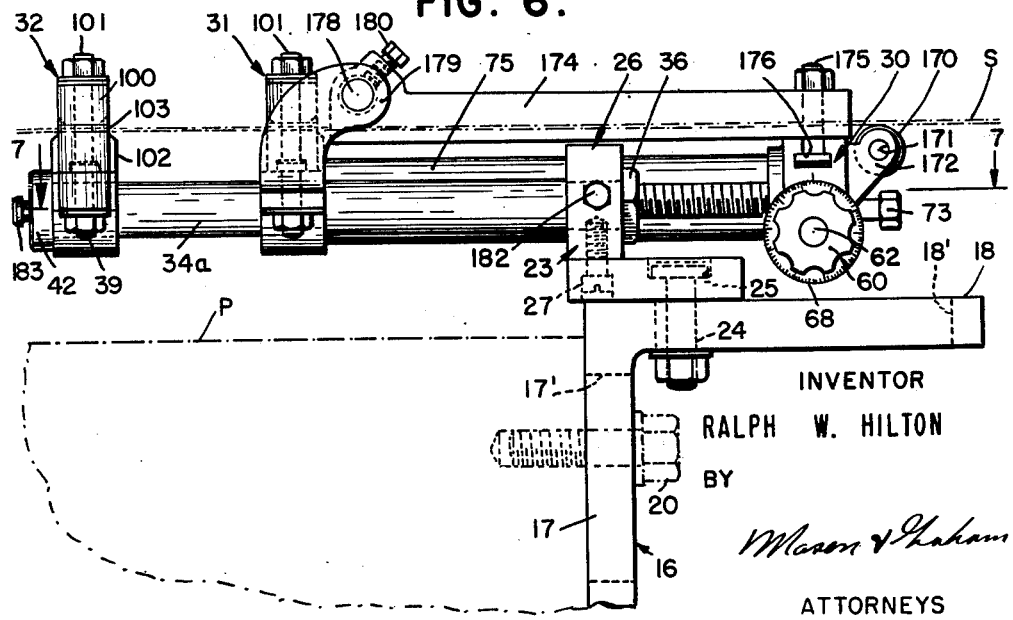
INVENTOR
RALPH W. HILTON
BY
Mason & Graham
ATTORNEYS

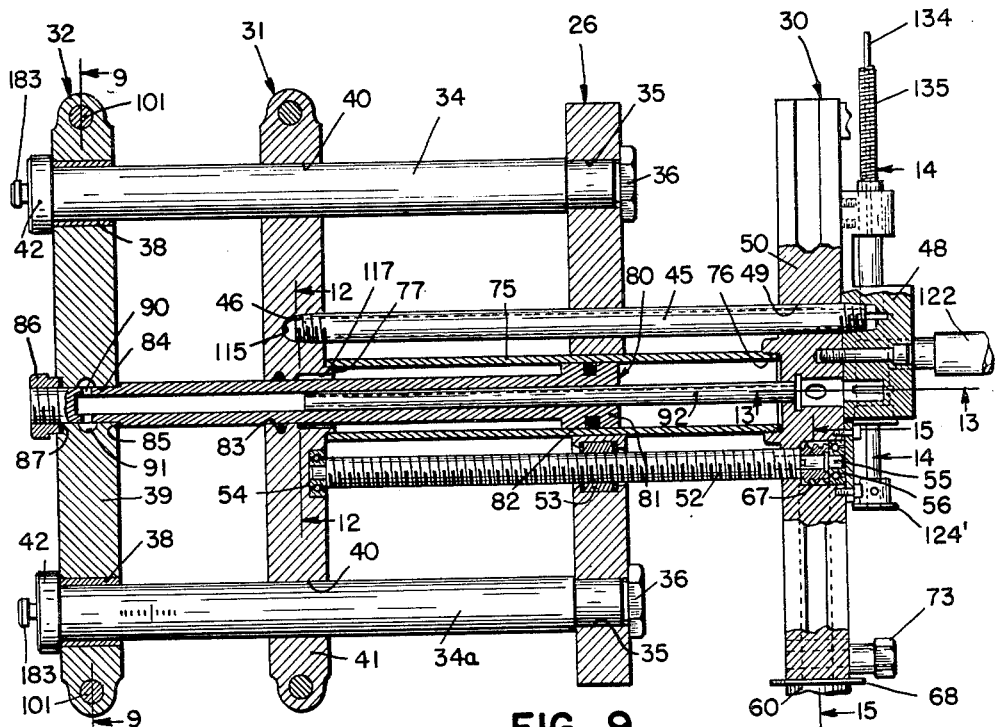
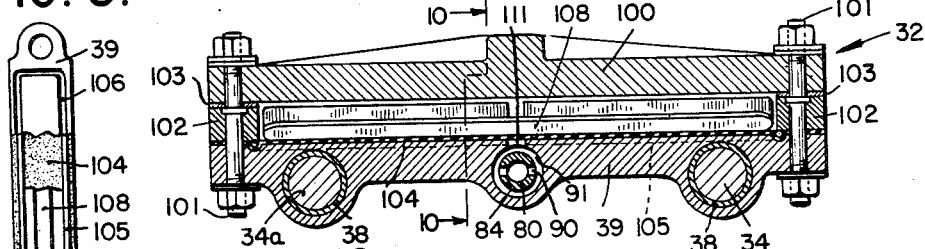
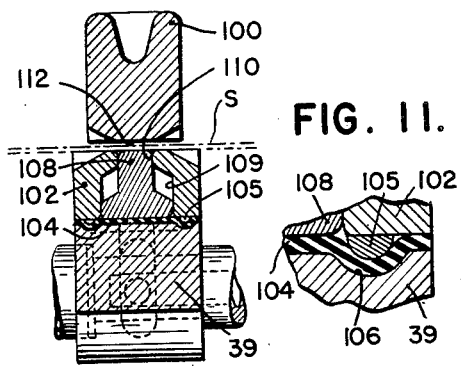

March 8, 1955 R. W. HILTON 2,703,711
PRESSURE FLUID CONTROLLED STOCK FEEDER FOR PUNCH PRESSES
Filed Sept. 1, 1949 4 Sheets-Sheet 4

INVENTOR
RALPH W. HILTON
BY
ATTORNEYS

United States Patent Office 2,703,711
Patented Mar. 8, 1955

2,703,711

PRESSURE FLUID CONTROLLED STOCK FEEDER FOR PUNCH PRESSES

Ralph W. Hilton, Burbank, Calif., assignor of one-half to H. B. Armstrong, North Hollywood, J. H. Armstrong, Los Angeles, and Robert G. Bodtke, Burbank, Calif., jointly Application September 1, 1949, Serial No. 113,621

5 Claims. (Cl. 271—2.5)

This invention has to do with feeding mechanisms used in conjunction with punch presses and other machine tools for automatically accurately metering or feeding stock to the machines.

An object of the invention is to provide a novel stock feeder or feeding apparatus for automatically feeding strip, ribbon, or other stock to a punch press or other machine which may be readily adjustably secured to the machine and quickly adjusted both as to the stroke of the feed and as to the dimensions of the stock to be fed.

Another object of the invention is to provide such a stock feeder which may be set up to operate or be controlled by the machine with which it is associated or which may be manually controlled.

Another object is to provide a stock feeder which can be used for automatically feeding strip, ribbon, or other stock, which is self-indexing and requires no stop for the material fed.

Another object is to provide a device of the type indicated which is effective to feed stock independently of the stroke of the press or the movement of a part of the machine with which it is associated.

A still further object is to provide a stock feeder in which the timing and stroke of the feeder may be easily and quickly adjusted for different jobs.

Another object is to provide a stock feeding device which is operated by compressed air and which utilizes a stock gripping means also operated by compressed air. In this connection it is also an object to provide means for firmly gripping the stock without injuring the same.

Yet another object of the invention is to provide a simple automatic control mechanism for operating the feeding device in response to rotation of the crankshaft of a punch press or other machine.

A still further object of the invention is to provide in a stock feeder of the type indicated an adjustable means for retaining the stroke of the device in adjustment while the device is in operation.

These and other objects will be apparent from the drawings and the following description.

Referring to the drawings which are illustrative of one form of my invention,

Fig. 5 is a plan view of a stock feeder embodying the invention;

Fig. 6 is a side elevational view of the device of Fig. 5;

Fig. 7 is a section on line 7—7 of Fig. 6;

Fig. 8 is a sectional plan view of the movable feed head assembly, the view being broken away at different planes;

Fig. 9 is a section on line 9—9 of Fig. 7;

Fig. 10 is a section on line 10—10 of Fig. 9;

Fig. 11 is an enlarged detail of a portion of the device shown in Fig. 10, the section being in the same plane;

Figure 1:
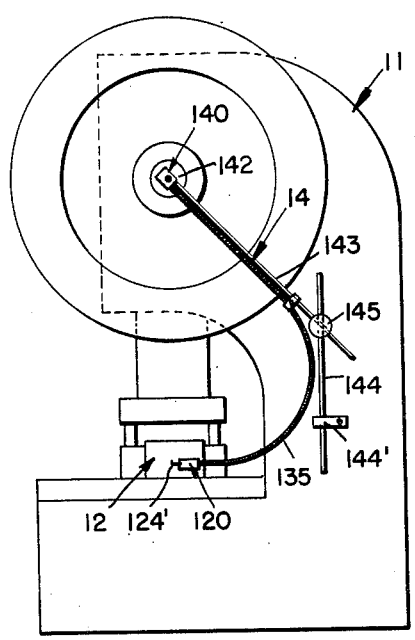
Fig. 1 is a schematic elevational view of a punch press showing a stock feeder embodying the invention associated therewith.
Figure 2:
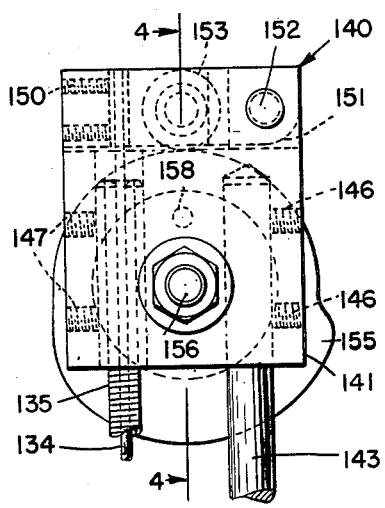
Fig. 2 is an elevational view of a cam mechanism forming part of the control means which attaches to the crankshaft of the punch press.
Figure 3:
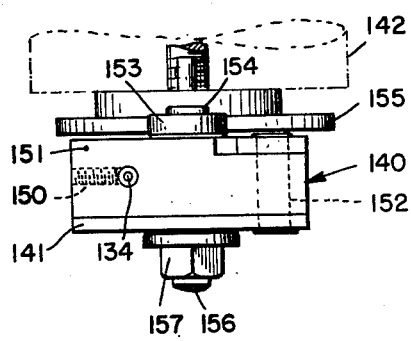
Fig. 3 is a plan view of the device of Fig. 2.
Figure 4:
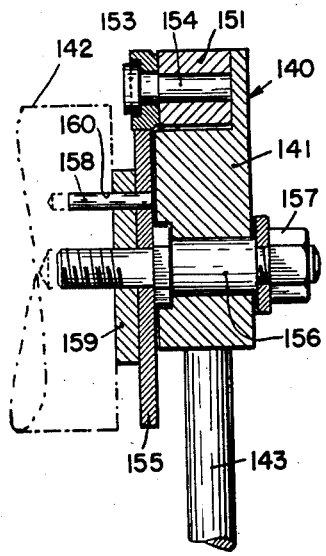
Fig. 4 is a section on line 4—4 of Fig. 2.

More particularly describing the invention, reference numeral 11 generally indicates a punch press to which is attached a stock feeder 12 embodying the invention. The stock feeder may be attached to the bolster plate or frame of the punch press or other machine with which it is to be used. The control means for operating the feeder in timed relation to the press is generally indicated by 14.

Referring particularly to Figs. 5–16, the stock feeder is provided with a mounting plate 16 of right angle form including an upright plate portion 17 and what will be termed a horizontal section 18. Each plate section has laterally spaced slots, indicated by 17' and 18', to accommodate mounting bolts. In Fig. 6, bolts 20 are shown securing the mounting plate to a part P of a punch press or other machine.

The upper section 18 of the mounting plate is adapted to have secured to it a frame base plate 23 of the stock feeder as by bolts 24. The heads of the bolts are received in T slots 25 in the base plate to permit of adjustment of the feeder with respect to the mounting plate. The frame 26 of the stock feeder is secured to this base plate 23 by suitable bolts 27.

In general, the frame 26 supports a cylinder head assembly 30, a fixed feed head assembly 31, and a movable feed head assembly 32. The assembly 32 is adapted to be reciprocated relative to the frame 26 and the two assemblies 30 and 31. During movement of the movable head assembly from a position adjacent the fixed head assembly 31 the movable head assembly is adapted to grip the stock S (shown in broken lines in Fig. 5). The original spacing of the assemblies 31 and 32 with the assembly 32 in extended position determines the stroke of the stock feeder. The assembly 31 is made adjustable relative to the frame 26 for varying the spacing. As will later appear, fluid pressure means are used for operating the device.

The frame 26 supports a pair of lead bars 34 and 34a which are mounted in bores 35 in the frame and secured in place by nuts 36. The outer ends of these lead bars are received in bearing sleeves 38 in the lower feed bar 39 of the movable clamp assembly 32. These bars are also slidably received in bores 40 in the lower feed bar 41 of the fixed feed head assembly 31. Heads 42 are provided on the ends of the lead bars to limit movement of the movable feed head assembly.

The frame also supports a lead tube 45 which has one end secured in a tapped recess 46 in the lower feed bar of the fixed feed head assembly 31 and the other end similarly secured in a valve body 48 forming part of the cylinder head assembly, the tube passing through a bore 49 in the cylinder head 50. Mounted parallel with the lead tube is a metering screw 52 which is received in a stationary nut 53 mounted in the frame 26. One end of the screw is rotatably secured in a bearing 54 in the lower feed bar 41 of the fixed feed head assembly. The other end is rotatably secured in number 50 being provided with an axial extension 55 which is mounted in a bearing 56. The screw is so mounted in the bearings that the same is secured against axial movement relative thereto. Thus, when the screw is turned, the two assemblies 30 and 31 move as a unit relative to the frame 26 adjustably spacing the fixed and movable feed head assemblies 31 and 32, respectively. A micrometer adjustment means is provided for turning the screw. This comprises a knob 60 which is adjustably mounted by set screw 61 on a shaft 62 rotatably received in a bore 63 at one end of member 50. The knob 60 is provided with a plate 68 upon which any suitable scale or indicia may be provided. The inner end of the shaft is provided with a pin 64, the outer end of which is received in a bearing 65. Keyed to the shaft is a spiral gear 66 which meshes with a corresponding spiral gear 67 on the screw 52.

Figure 15:
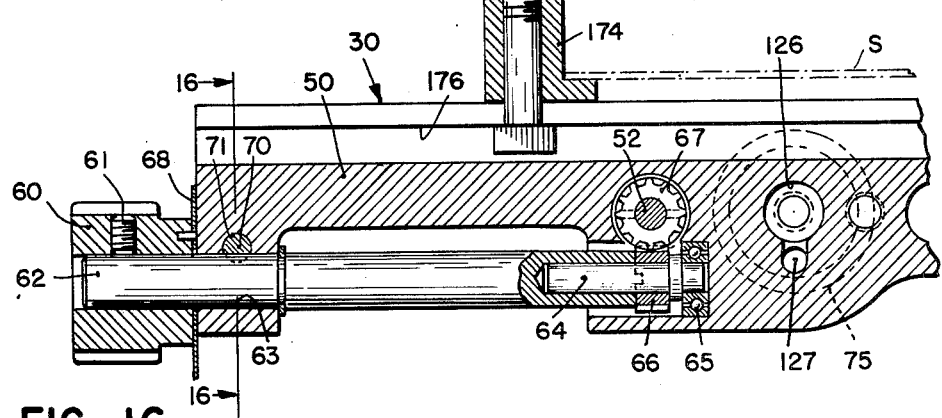
Fig. 15 is a section on line 15—15 of Fig. 7.
Figure 16:
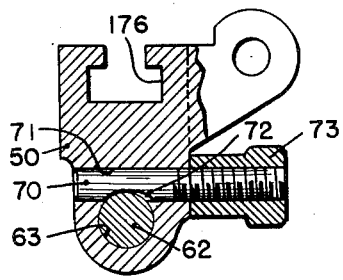
Fig. 16 is a section on line 16—16 of Fig. 15.

As shown in Figs. 15 and 16, I provide a lock pin 70 for shaft 62. The lock pin is received in a bore 71 at right angles to and partially intersecting the bore 63 receiving the shaft 62. This pin is provided with a recess 72 on a radius slightly greater than that of the shaft for receiving the shaft. The pin is provided with a nut 73 at its outer end which, when tightened, locks shaft 62 against turning by jamming the pin 70 against it to exert a braking action.

Mounted between the cylinder head 50 and the lower feed bar 41 of the fixed feed head assembly is a cylinder 75, one end of the cylinder being mounted in a threaded recess 76 in member 50. The other end of the cylinder surrounds an annular flange 77. The cylinder receives a piston 80 which is tubular in form, having a head 81 with a packing ring 82 therein. The piston is slidably received in a bore 83 in member 41 and is secured to member 39, passing through bore 84. The piston is provided with a shoulder 85 which abuts the inner side of member 39. The outer end is threaded to accommodate a retaining nut 86, a packing 87 being positioned between the nut and member 39.

In the region of the lower feed bar 39 the piston 80 is provided with lateral ports 90 which communicate with an annular space 91 in the member 39. For the purpose of providing a supply of compressed air to the movable feed head assembly I provide an air tube 92 which is secured in the head 50 and is slidably received within the piston 80 as best shown in Fig. 7.

Compressed air is supplied to the fixed feed head assembly by means of the lead tube 45. Both the lead tube 45 and air tube 92 are connected by passageways, which will be described, with the valve body 48.

In a general way, in the operation of the device a supply of compressed air is provided and this is utilized for reciprocating the movable feed head assembly 32. At the same time air is supplied to both the movable and fixed head assemblies in timed relation with the stroke so that the movable head assembly will grip the stock and move it toward the machine with which the stock feeder is associated. During this movement the stock gripping means of the fixed feed head assembly is relaxed. However, at the completion of the stroke advancing the stock, the fixed feed head assembly grips the stock and the movable feed head assembly releases the same for the return stroke.

Referring particularly to Figs. 5–11, the construction of the movable feed head assembly will now be described. This assembly includes lower feed bar 39 previously referred to and an upper feed bar 100 which is secured to the lower bar by bolt means 101. A pressure bar housing 102 is interposed between the parts 100 and 39. Shims 103 are provided for spacing the upper feed bar at a height determined by the thickness of the stock to be fed.

The lower feed bar 39 is provided with a flexible diaphragm 104 of rubber or other suitable expansible material which is anchored in place by means of a retaining ring 105 located beneath the pressure pad housing. The ring overlies a recess 106 in the upper surface of the bar 39.

A pressure bar 108 of inverted T-section is received within the central portion of the housing 102. For this purpose the housing is provided with elongated central opening 109 which converges at its upper end to an opening 110 of less width adapted to receive the upper portion of the pressure bar 108. The base of the pressure bar rests on the diaphragm 104 whereby when the diaphragm is raised under the influence of pressure fluid supplied to it through the medium of air tube 92, piston 80, ports 90, space 91, and port 111, the pressure bar is moved upwardly to engage the stock S (Fig. 10). As a result, the stock is firmly gripped between the pressure bar and the lower surface 112 of the upper feed bar 100.

The construction of the fixed feed head assembly 31 is substantially the same as that shown and described for the movable feed head assembly and therefore will not be described in detail except as to the differences in construction.

Figure 12:
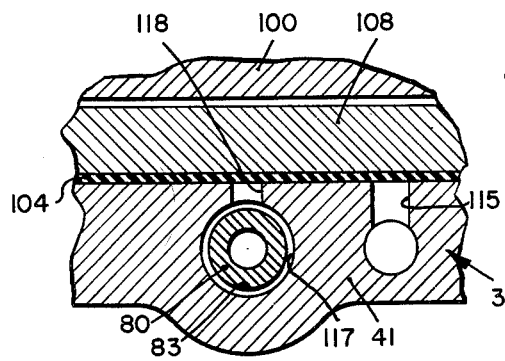
Fig. 12 is a section on line 12—12 of Fig. 7.
Figure 13:
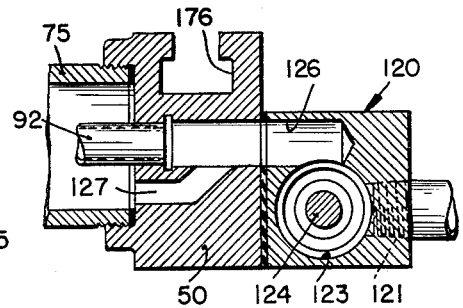
Fig. 13 is a section on line 13—13 of Fig. 7.
Figure 14:
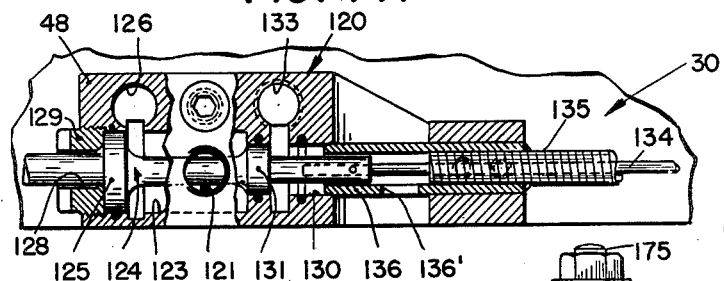
Fig. 14 is a section on line 14—14 of Fig. 7.

Referring to Figs. 7 and 12, it will be seen that the diaphragm of the lower feed bar 41 of this assembly is supplied by air through tube 45, the end of which communicates with a passage 115 leading to the diaphragm 104 of the lower feed bar. The end of the cylinder 75 is also in communication with the lower surface of the diaphragm through the medium of the annular space 117 and a port 118.

In order to provide for selectively supplying air to the piston and to the feed head assemblies, a valve mechanism, generally indicated by 120, is provided. This includes the valve body 48 (Figs. 7, 13, 14) having an inlet 121 to which an air hose 122 leading from any suitable source of compressed air may be connected. The valve body contains a center bore 123 with which the inlet communicates. Mounted for axial movement in the valve body is a valve element 124 which has a large valve flange 125 thereon within the bore 123. This valve flange is adapted, upon movement of the valve 124 from left to right (Fig. 14) to close off the pressure fluid from reaching a passage 126 leading to the air tube 92 and provided with a branch passage 127 communicating with the interior of cylinder 75. At the same time it connects these passages with the atmosphere through passage 128 in nut 129. In the position shown, the said passages are in communication with bore 123.

The valve body is also provided with a counterbore 130 in which is slidably mounted a small flange 131 on the valve which is adapted, when the valve is moved from left to right, to establish communication between bore 123 and a passageway system including passage 133 leading to the interior of the tube 45 which supplies air to the fixed feed head assembly. In the position in which the valve is shown the passageway system communicates with the atmosphere through a sleeve 136 having a port 136′.

While the valve 124 may be operated manually by a knob 124′, I prefer to provide a flexible wire 134 thereon and operate the same by the automatic control means, generally designated by numeral 14 and shown in Figs. 1–4. The end of the wire is fixed in the end of the valve 124 and passes through a flexible conduit 135 which is secured within the sleeve 136.

The control wire is operated by a cam mechanism, generally indicated by 140 and shown in Figs. 1–4. This includes a body 141 which is supported at a desired radius to the crankshaft 142 of the punch press by means of a rod 143 which is secured on a standard 144 mounted on the punch press body in any suitable manner as by bracket 144′. A conventional joint 145 serves to secure the rod 143 to the standard at any angle and at an adjusted height thereon. The upper end of the rod 143 is received in the body 141 and secured by set screws 146.

The outer end of the flexible conduit 135 is also secured in the body 141 and this may be by set screws 147. The outer end of the wire 134 is mounted by set screws 150 in a lever 151 which is pivotally mounted at 152 on the body 141. This lever carries a roller 153 on a pin 154 which is adapted to ride on a cam 155. The cam is mounted for rotation on a mounting bolt 156 which threads into the crankshaft 142 of the punch press. The body 141 is rotatably mounted on the bolt, being held by nut 157. A dowel pin 158 projects from the cam through a washer 159 into a hole 160 provided in the crankshaft 142 whereby the cam rotates with the crankshaft.

It will be apparent that upon rotation of the crankshaft and cam 155 the lever 151 will be raised periodically in timed relation to the rotation of the crankshaft and this will serve to operate the valve 124 through the medium of the flexible wire 134.

For guiding the stock through the machine I provide a roller 170 rotatably mounted by means of pins 171 in its ends in apertured ears 172 at the side of the cylinder head 50. Between the cylinder head and the fixed feed head assembly are a pair of stock guide bars 174 of L shape in cross section. These bars are adjustably mounted on the cylinder head 50 by bolts 175, the heads of which are received in T grooves 176 in the head. The other ends of the bars are apertured to slidably receive a mounting rod 178 supported by a pair of ears or extensions 179 apertured to receive the rod. Set screws 180 serve to secure the stock guide bars 174 in adjusted position on the rod.

If desired, a guard G may be provided and this may be supported on bolts 182 in frame 26 and bolts 183 in the ends of the lead bars 34 and 34a.

In the operation of the device, assuming the same has been properly secured to the punch press or other machine, the desired feed stroke is obtained by adjusting the spacing of the movable and fixed feed head assemblies with the movable assembly extended. This is accomplished by turning the lead screw 52 through the medium of rotating the adjustment knob 60. After the correct setting has been made, the lock pin 70 is tightened to lock the parts in adjusted position.

The correct timing and the number of feed strokes for each revolution of the crankshaft of the press is obtained by choosing the correct cam and adjusting the angle of the cam mechanism 140.

In the drawings the parts of the device are shown as they would appear at the end of the feed stroke. In this position, compressed air is supplied to the cylinder 75 through passages 126 and 127 leading from the main chamber 123 of the valve. Air is also supplied through passage 126, tube 92, piston 80, ports 90, and passage 91 and ports 111 to expand the diaphragm of the movable feed head assembly 32. The stock is thus gripped by the pressure bar of this assembly. At the same time passage 133 in the valve body is open to atmosphere through bore 130, sleeve 136, and port 136' in the sleeve with the result that the diaphragm of the fixed feed head assembly 31 is not expanded and its pressure bar does not engage the stock.

Upon actuation of the valve, either manually or by the automatic means described previously, passageway 126 is closed off from the compressed air by the valve flange 125 and is placed in communication with the atmosphere through passage 128 in nut 129. This relieves the pressure on the piston and against the diaphragm of the movable feed head assembly whereby the latter releases its grip on the stock. At the same time, since the flange 131 of the valve has also moved to the right (Fig. 14), pressure fluid is supplied to passage 133, tube 45, passage 115 and hence to the diaphragm of the fixed feed head assembly. This acts to cause the pressure bar of this assembly to grip the stock. It also provides pressure through passages 118 and 117 to the cylinder 75 for moving the piston and movable feed head assembly until the latter engages the fixed feed head assembly at the end of the return stroke. The cam 155 is so proportioned that it will hold the valve in the position just described long enough for the completion of the return stroke.

When the valve is returned to its original position the fixed feed head assembly releases the stock and the movable feed head assembly grips the stock and carries it forward until the parts are in the position shown.

Although the invention has been particularly shown and described, it is contemplated that various changes and modifications can be made without departing from the scope thereof as defined in the claims.

I claim:

1. In a stock feeder, a frame, a pair of parallel lead bars mounted on said frame and projecting therefrom, a movable feed head assembly mounted on said bars for reciprocation thereon, stop means carried by said bars limiting movement of said movable feed head assembly in a direction away from said frame, a fixed feed head assembly mounted on said bars intermediate said frame and said movable feed head assembly, said fixed feed head assembly being in the path of movement of and limiting movement of said movable feed head assembly in a direction toward said frame, stock gripping means on each of said assemblies, a cylinder head assembly on the side of said frame opposite to said feed head assemblies, a cylinder fixedly connected to said fixed feed head assembly and said cylinder head assembly, a piston in said cylinder operatively connected to said movable feed head assembly, and an adjustment screw operatively connecting said fixed feed head assembly and said cylinder head assembly with said frame for adjustably positioning said fixed feed head assembly on said lead bars.

2. In a stock feeder, a frame structure, a movable head assembly supported on said frame structure for straight line reciprocatory movement, pressure fluid actuated stock gripping means on said assembly, a cylinder carried by said frame structure and a piston in said cylinder, said piston including a hollow piston rod operatively connected to said movable head assembly, a pressure fluid tube mounted on the frame structure extending axially of the cylinder and slidably received in said piston and piston rod, said frame having fluid passage means communicating with the end of said pressure fluid tube and said cylinder, said hollow piston rod providing a passage for conducting pressure fluid from said pressure tube to the stock gripping means of said head assembly.

3. In a stock feeder, a frame structure, a movable head assembly supported on said frame structure for straight line reciprocatory movement, pressure fluid actuated stock gripping means on said assembly, a cylinder carried by said frame structure, a piston in said cylinder, said piston including a hollow piston rod operatively connected to said movable head assembly, a pressure fluid tube mounted on the frame structure extending axially of the cylinder and slidably received in said piston and piston rod, said frame having fluid passage means communicating with the end of said pressure fluid tube and said cylinder, said hollow piston rod providing a passage for conducting pressure fluid from said pressure tube to the stock gripping means of said head assembly, a fixed head assembly supported by said frame structure, said fixed head assembly having stock gripping means operable by pressure fluid, means providing a fluid passage for conducting pressure fluid to the stock gripping means of said fixed head assembly, and fluid by-pass means connecting one end of said cylinder with said fluid passage.

4. In a stock feeder, a frame structure, a movable head assembly supported on said frame structure for straight line reciprocatory movement, pressure fluid actuated stock gripping means on said assembly, a cylinder carried by said frame structure, a piston in said cylinder, said piston including a hollow piston rod operatively connected to said movable head assembly, a pressure fluid tube mounted on the frame structure extending axially of the cylinder and slidably received in said piston and piston rod, said frame having fluid passage means communicating with the end of said pressure fluid tube and said cylinder, said hollow piston rod providing a passage for conducting presure fluid from said pressure tube to the stock gripping means of said head assembly, a fixed head assembly supported by said frame structure, said fixed head assembly having stock gripping means operable by pressure fluid, means providing a fluid passage for conducting pressure fluid to the stock gripping means of said fixed head assembly, fluid by-pass means connecting one end of said cylinder with said fluid passage, said fixed head assembly forming an abutment for limiting movement of said movable head assembly, and means for adjustably positioning said fixed head assembly.

5. In a stock feeder, a frame, a fixed feed head assembly mounted on said frame, a movable feed head assembly mounted on said frame for movement toward and away from said fixed feed head assembly, said fixed feed head assembly being in the path of movement of and acting as a stop for limiting movement of said movable feed head assembly in one direction, stop means carried by said frame limiting movement of said movable feed head assembly in a direction opposite to said one direction, a cylinder head assembly, said movable feed head assembly and said cylinder head assembly being on opposite sides of said fixed feed head assembly, a cylinder extending between said cylinder header assembly and said fixed feed head assembly, a piston in said cylinder connected to said movable feed head assembly, means for supplying pressure fluid to the ends of said cylinder to reciprocate said movable feed head assembly, and means for causing said movable and fixed feed head assemblies to grip the stock independently of each other during predetermined portions of the reciprocation cycle of said movable feed head assembly, said fixed feed head assembly, said cylinder head assembly and said cylinder being adjustably mounted as a unit on said frame whereby to vary the maximum permissible spacing of the fixed and movable feed head assemblies.

References Cited in the file of this patent

UNITED STATES PATENTS

| Number | Name | Date |
| --- | --- | --- |
| 1,458,339 | Hancock | June 12, 1923 |
| 2,020,765 | Breitenbach | Nov. 12, 1934 |
| 2,025,755 | Lyle | Dec. 31, 1935 |
| 2,096,073 | Spencer | Oct. 19, 1937 |
| 2,228,245 | Barker | Jan. 14, 1941 |
| 2,349,520 | Ripley | May 23, 1944 |
| 2,382,958 | Burgoine | Aug. 21, 1945 |
| 2,379,002 | Haller | June 26, 1945 |
| 2,428,493 | Haller | Oct. 7, 1947 |
| 2,467,740 | Haller | Apr. 19, 1949 |
| 2,556,305 | Vickers | June 12, 1951 |